Sept. 22, 1964   W. W. SMITH   3,149,660
METHODS AND APPARATUS FOR AUTOMOBILE DAMAGE CORRECTION
Filed Aug. 20, 1962   6 Sheets-Sheet 6

INVENTOR
Woodrow W. Smith,
BY Watson, Cole, Grindle + Watson
ATTORNEYS

United States Patent Office 3,149,660
Patented Sept. 22, 1964

3,149,660
METHODS AND APPARATUS FOR AUTOMOBILE DAMAGE CORRECTION
Woodrow W. Smith, Box 929, Grand Prairie, Tex.
Filed Aug. 20, 1962, Ser. No. 217,987
5 Claims. (Cl. 153—32)

The present invention relates to methods and portable mechanical apparatus for restoring an automobile body or frame to its original dimensions and shape after the said automobile has been damaged in a collision with another automobile or other substantial object.

This application is a continuation-in-part of my co-pending application Serial No. 705,924, filed December 30, 1957, and now Patent No. 3,050,099, granted August 21, 1962.

The principal object of the present invention is to provide a simple portable apparatus and method for the correction of collision damage in the structural elements of an automobile without separation of the body from the frame while restoring the automobile structural members to their original and normal shape.

In accordance with the present invention, a wheel support portable apparatus is provided which has a principal longitudinal beam of tubular form with a force applying system adjacent one end thereof, a force reaction means is provided which is attachable to another tubular beam adjacent one end, the second tubular beam being slidably fitted within the principal beam for axial movement to extend the total working length of the apparatus without altering the established wheel base length of the supporting wheels.

It is another object of this invention to provide means for supporting a substantial portion of the weight of a motor vehicle in a cantilever manner above the apparatus which is longitudinally disposed under said vehicle, said apparatus having means to apply a tensile force to the vehicle adjacent the raised end and force reaction means adjacent the opposite end of said vehicle with said tensile force co-operating with the gravitational mass in the suspended portions of the said vehicle to restore the damaged structural members to their original shape.

A further object of the present invention is to provide a portable metal straightening apparatus having a force reaction means and a plurality of force applying means operable at optional different levels of height than the said reaction means and wherein a plurality of correction forces may be applied to an automobile in a plurality of directions by independent prime forces as needed to complete the straightening operation.

A still further object of this invention is to provide a method of applying a plurality of correction forces to an automobile frame wherein a force will cause transverse bending in a portion of said frame, another force will cause longitudinal compression in another portion of said frame and another portion of said frame will be elongated as a result of a prime force applied transversely to the said automobile by the present apparatus.

Another object of this invention is to provide a method of applying multiple correction forces to collision damaged areas of the automobile and simultaneous multiple reaction forces to other areas of the said automobile with all of the prime and reaction forces operating in a plurality of directions upon the automobile for the simultaneous correction of numerous damaged areas of the automobile body and chassis combination, and wherein the applied correction forces will cause co-operating motion in adjacent areas which will divide the total operating forces into numerous correction forces with each area force having less intensity than the said prime and reacting forces to correct the whole body of the automobile without damaging the smaller structural component parts of the whole body by the use of excessive localized forces.

Other and further objects of the invention are to provide the devices and methods defined in the appended claims.

With these and other objects in view, as will more fully appear from the following specification and as illustrated in the accompanying drawings, the invention comprises certain novel combinations of methods relating to the art. My invention further resides in the combination, construction and arrangement of parts illustrated in the accompanying drawings, and while I have shown therein what is now considered to be the preferred embodiment of this invention, I desire the same to be understood as illustrative only and not to be interpreted in a limiting sense.

In the drawings annexed hereto and forming a part hereof.

Reference will now be made in greater detail to the drawings annexed hereto and forming a part hereof for a more complete description of this invention. The present invention consists of a portable apparatus with a number of co-operating attachable component parts which may be used selectively in carrying out the purposes of this invention. It should be noted that no provision is made in the present invention for the preliminary measuring or gauging of an abnormal frame, it being assumed that the various abnormalities of said frame have been determined prior to the operation of the present invention.

Figures 1, 2, 3, 4, 5, 6, 7, 8:
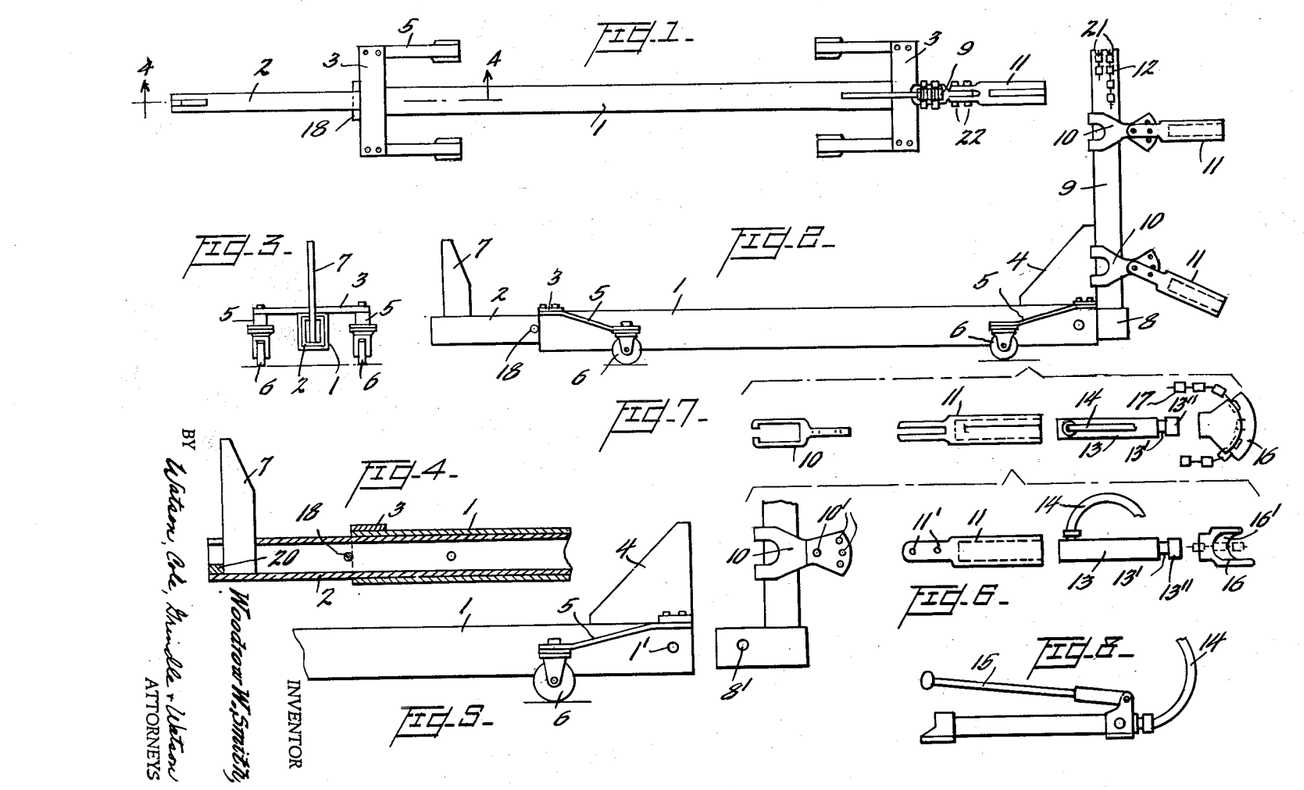
FIGURE 1 is a plan view of an apparatus according to the present invention.
FIGURE 2 is a side elevation of an apparatus of the present invention.
FIGURE 3 is an end elevation of one end of the apparatus.
FIGURE 4 is a vertical longitudinal section of a portion of the apparatus taken on line 4—4 of FIGURE 1.
FIGURE 5 is a side elevation of a portion of one end of FIGURE 2.
FIGURE 6 is an exploded view showing, in side elevation, a portion of the vertical element shown at the right end of FIGURE 2, and elements associated therewith.
FIGURE 7 is a plan view corresponding to FIGURE 6.
FIGURE 8 is a side elevation of a hydraulic pump element which is connected to the jack of FIGURES 6 and 7 by means of a flexible hose.

The preferred embodiment of this invention is generally illustrated in FIGURES 1, 2 and 3, which illustrate certain improvements in construction detail and methods of usage over the device of my original patent application Serial No. 705,924, filed December 30, 1957, and in FIGURES 9 through 16 which illustrate means for applying a tensile pulling force in a plurality of directions.

The apparatus of the present invention includes a longitudinal principal beam 1, for the resistance of a generally compressive force. Beam 1 is preferably in the form of a rectangular section tube, for the greatest strength-to-weight ratio, of low elevation and for use under an automobile of normal height. The beam 1 in the present embodiment, consists of two structural channels with the flanges welded together to form a tube. The beam 2 is also a rectangular tube which is slidable axially within the tube 1, as shown in FIGURES 1 and 2. Movement of the tube 2 in the tube 1 permits a variable working distance between the force applying posts 7 and 9 without altering the established wheel base distance of the wheels 6. The weight of the said apparatus is supported by the beam 1, springs 5 and wheels 6 so that the beam 2 may be easily positioned in an axial direction in respect to beam 1. The abutment post 7 is attachable to one end of beam 2 and is operatively applicable to a frame even when the apparatus is positioned under an automobile, the said abutment 7 being receivable in a slot in the top web of beam 2 and being maintained in position by the block 20 welded in place as shown in FIGURE 4. The beam 2 is secured against axial inward movement with respect to beam 1 by a pin 18 which is inserted through holes 18' in the sides of beam 2.

A short rectangular tube 8 having a cantilever type post 9 welded thereto is insertable within the other end of beam 1, and secured thereto by means of a bolt through companion holes 1' and 8' in beam 1 and tube 8, respectively, thereby extending post 9 transversely to the beam 2 to a higher elevation than any part of an automobile frame. A gusset brace 4 in FIGURES 2 and 5 serves as a brace to aid in resisting bending moments imposed on the post 9 while in operation. A cross member 3 at each end of the beam 1 provides support means for the leaf springs 5 which have dirigible caster wheels 6 secured to the opposite ends of said springs to provide resilient support to the apparatus and to enable said apparatus to achieve complete operative mobility in any horizontal direction.

One or more adjustable brackets 10 are movable axially on the strain sustaining post 9 and are supported at any desired height by means of the chains 12 which engage locking notches 21 at the top of post 9, as shown in FIGURE 2. Each bracket 10 is constructed with a laterally extending flat portion wherein a series of holes are located for the reception of the pins 22, FIGURE 1, for attaching the jack holder 11 thereto, said jack holder 11 having a bifurcated end with two holes 11' therethrough which match the holes in the flat portion of housing 10. The outer end of said jack holder 11 is hollow, with a slot in its top side, for the reception of a hydraulic ram 13 within the hollow portion.

A flexible hose 14 connects the hydraulic ram 13 to a hydraulic pump 15 wherein fluid under pressure is supplied by said pump 15 to said hydraulic ram 13 to cause movement of an internal plunger 13' within said arm 13, said internal plunger extending outwardly from the said hydraulic ram and having a threaded end portion 13" to receive a chain holding tool 16 which has an arcuate groove 16' around its outer end for the reception of the force transmitting means or flexible chain 17. The above described combination of elements from the vertical post 9 through the chain holding tool 16 constitutes the force applying system when the opposite end of chain 17 is connected to a part of an automobile frame and/or body and the abutment post 7 is engaged with said automobile beyond the point of frame damage.

Figures 9, 10, 11, 12, 13, 14, 15, 16:
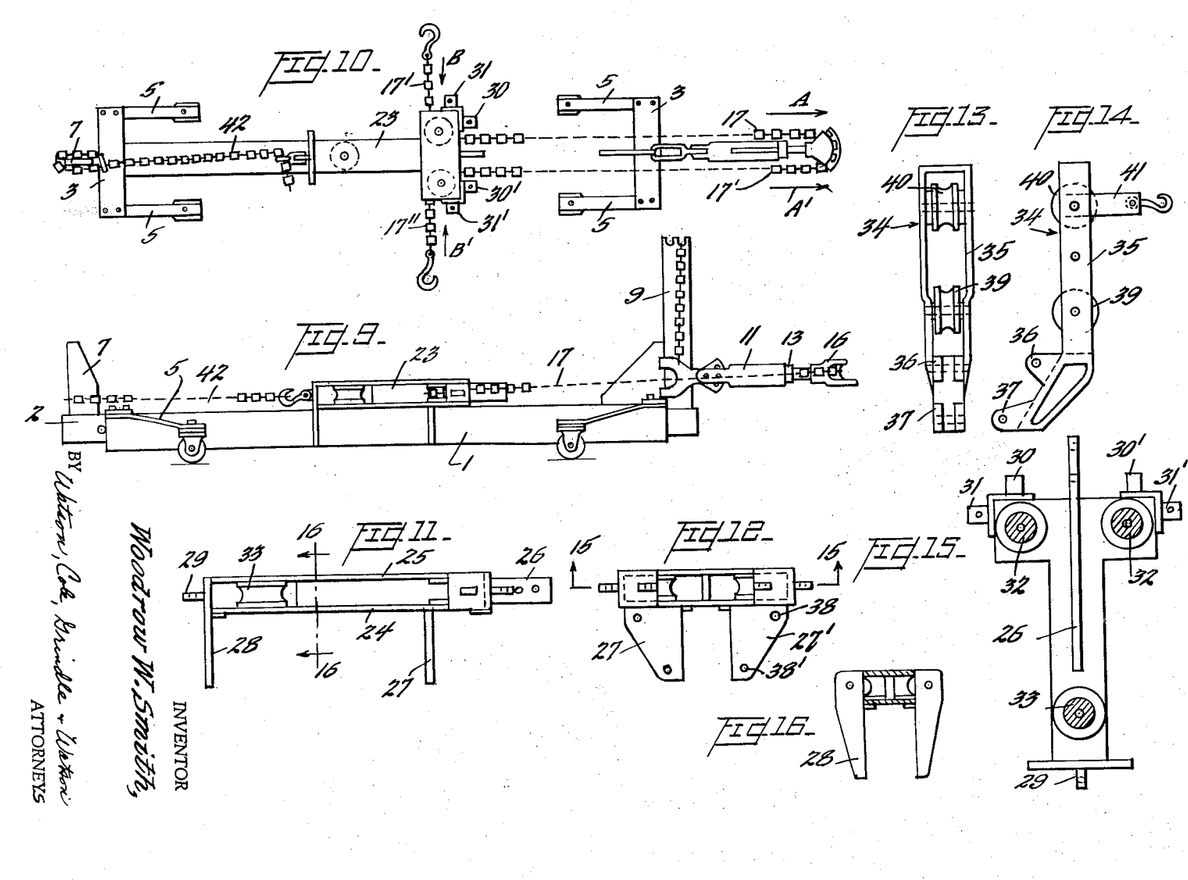
FIGURE 9 is a side elevation view of the invention with a force transmission unit on the longitudinal beam.
FIGURE 10 is a plan view of the present invention with the force transmission unit in place and illustrating an opposed tensile pulling force transversely to the longitudinal beam.
FIGURE 11 is a side elevation view of the force transmission unit.
FIGURE 12 is an end elevation view of the force transmission unit, illustrating the right end of the unit of FIGURES 9 and 10.
FIGURE 13 is an end elevation view of an elevated post attachment for the force transmission unit showing the end attachable to the lower gusset plate of the unit of FIGURE 12.
FIGURE 14 is a side elevation view of the elevated post attachment in the position for attachment to the unit of FIGURE 12.
FIGURE 15 is a horizontal sectional view of the force transmission unit taken on lines 15—15 of FIGURE 12.
FIGURE 16 is a transverse vertical section of the force transmission unit taken on lines 16—16 of FIGURE 11.

FIGURE 9 is a side elevation view of the straightening machine with a force transmission unit 23 supported and guided on the beam 1. The force applying means of the straightening machine, insclnding the post 9, jack 13 and chain holder 16 operate to apply a tensile force in the chain 17, 17' which passes into the housing of the said force transmission unit 23 and around pulleys 32 and 32' (FIGURE 19), causing the chain ends 17 and 17' to exert a tensile pulling force transversely to the beam 1. A reaction force chain 42 is connected to the lug 29 (FIGURE 11) by means of a hook and the other end of the reaction chain 42 is connected to the reaction post 7 to prevent axial movement of the force transmission unit 23 along the beam 1.

FIGURE 10 is a plan view of the apparatus in FIGURE 9 and illustrates the direction of the applied forces wherein the hydraulic jack 13, 16 moves the chain portions 17 and 17' in the direction of the arrows A and A' in a longitudinal direction. The chains 17 and 17' extend around the two pulleys 32 and 32' and outwardly in opposed directions transversely to the longitudinal beam 1 to cause opposed tensile pulling forces to be exerted transversely to the direction of the force applied by the jack 8.

FIGURE 11 is a side elevation of the force transmission unit 23 and FIGURE 12 is an end elevation of the same apparatus which consists of a bottom plate 24 which may be supported on the beam 1, a top plate 25 at a spaced distance above the said bottom plate, a central rib 26 extending longitudinally between the top and bottom plates and extending outwardly at the force applying end and which is adapted to receive a connection for a force applying means at the projected end. Gusset brace plates 27 and 27' extend below the bottom plate 24 in spaced apart relationship providing means to enable the beam 1 to guide the said unit 23. End plates 28 and 28' are secured to the top and bottom plates 24 and 25 to provide guiding means at the reaction end of the unit 23. The parts 24, 25, 26, 27, 27', 28, 29, 30, 30', 31 and 31' are welded together to form the frame or housing of the unit 23. Chain connection hooks may be attached to one or more of the lugs 29 through 31' as required to resist reaction forces according to the nature of the transverse forces being applied by the chains 17 and 17'. Opposed pulleys 32 and 32' and pulley 33 are secured in position for rotating on axle pins extending through the top and bottom plates 24 and 25.

FIGURE 13 is an end elevation of an attachable post assembly while FIGURE 14 is a side elevation of the assembly and illustrates the position in which the post assembly 34 is attachable to the force unit 23 by means of pins in the holes 38 and 38'. The lower end of post 34 has two bifurcated extension lugs 36 and 37 that are spaced apart to fit over the gusset plate 27' for securing the post assembly 34 to the unit 23. The purpose of the post assembly 34 is to provide a means of applying a tensile pulling force at a selective height above the beam 1 in a transverse direction thereto. When the post assembly 34 is attached, as described, to one side of the force transmission unit 23, the chain 17 will pass around one of the pulleys 32, then around pulley 39 in the post assembly, then upwardly and around the pulley 40, thence outwardly in a direction transverse to the beam 1, the terminal end of the chain 17 being attached to an automobile to exert a tensile pulling force on said automobile. Other holes such as 43 may be provided in the post assembly to enable the upper pulley 40 to be used at a selecitve height. A force reaction clevis and chain hook 41 is attached to the axle of the upper pulley 40 for the connection of a reaction force chain from the said hook to a location on the automobile to prevent tipping the apparatus over on its side when a transverse tensile pulling force is applied by the chain 17 as it passes around the pulley 40.

FIGURE 15 is a sectional view of the force transmission unit 23, taken on line 15—15 of FIGURE 12, and illustrates the preferred positions of the pulleys 32, 32' and 33. FIGURE 16 is a sectional view of the unit 23, taken on line 16—16 of FIGURE 11, and illustrates the end plate 28 which guides the force unit 23 on the beam 1. The upper corners of the plate 28 contains holes for the attachment of hooks which may be used for the connection of a force reaction chain as needed to balance the force imposed by chain 17 when it is used around pulley 33 to exert a transverse force (FIGURES 19, 20).

Figures 17, 18, 19, 20, 21, 22, 23:
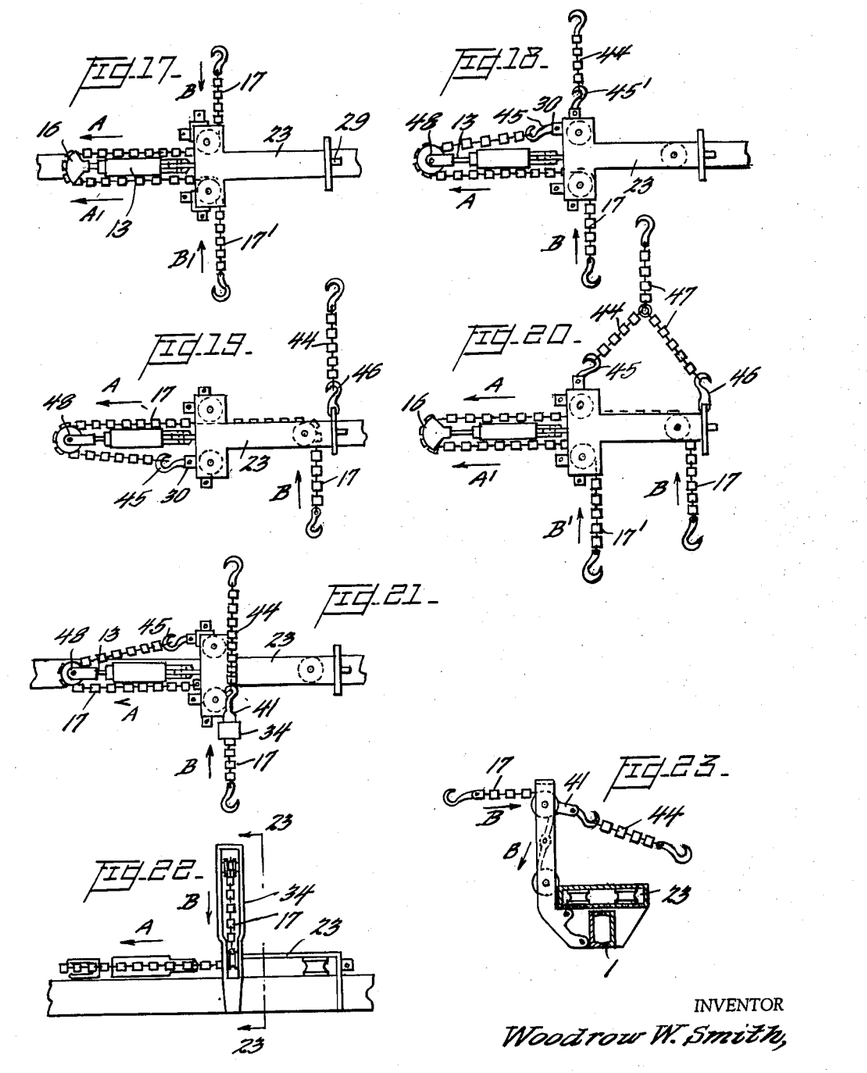
FIGURE 17 is a plan view of the force transmission unit illustrating an opposed tensile pulling force.
FIGURE 18 is a plan view of the force transmission unit showing a single tensile pulling force with a force reaction chain attachable to the automobile body.
FIGURE 19 is a plan view of the force transmission unit where the tensile pulling force is applied adjacent the opposite end of the unit with a force reaction chain connected near the pulling force.
FIGURE 20 is a plan view of the force transmission unit and showing a double tensile pulling force.
FIGURE 21 is a plan view of the force transmission unit with elevated post in position for applying a tensile force at a higher elevation than shown in the other figures.
FIGURE 22 is a side elevation view of the unit shown in FIGURE 21 to apply a tensile pull at a high elevation.
FIGURE 23 is a sectional view of the force unit in FIGURES 21 and 22, taken on line 27—27 of FIGURE 22, with elevated post in position to apply a tensile force at a high elevation and showing the force reaction means attached to the top pulley.

FIGURE 17 is a plan view of the force transmission unit mounted on the beam 1 and illustrates the mode of use for the application of two opposed tensile pulling forces in which the chain 17 extends around the chain holder tool 16 at the head end of the jack 13 which is secured to the member 26 and moves outwardly and away from the unit 23. The chain 17 is thereby moved in the direction of the arrows A and A', the respective reaches of said chain passing around the pulleys 32 and 32' and then transversely in both directions to provide opposed tensile pulling forces as indicated by the arrows B and B'. Because the forces are opposed and balanced, no means are required to balance any reaction forces in the unit.

FIGURE 18 is a plan view of the force unit 23 in which only one transverse tensile pulling force is used. In this case the jack 13 has a pulley 48 attached to its outer end to receive the chain 17 which is attached to the hook 45 secured to the lug 30 on the unit 23. Said chain 17 passes around the pulley 48, then around pulley 32 and outwardly to apply a tensile pulling force in a generally transverse direction to the beam 1. A hook 45' is secured to the lug 31 and a chain 44 is secured thereto to provide means to resist a reaction force when the other end of said chain 44 is attached to the automobile.

FIGURE 19 is still another mode of operation of the unit 23 in which the chain 17 passes around the pulley 33 at the far end of the unit 23 and outwardly to apply the tranverse tensile pulling force. In this case, the reaction chain 44 is connected to the hook 45 which is secured to the end plate 28 of the force unit 23.

FIGURE 20 is a plan view of the force unit 23 in which the mode of operation consists of using the chain 17 around the pulleys 32 and 33, then outwardly in a generally transverse direction to apply two tensile pulling forces to an automobile in the direction of the arrows B and B'. The reaction means needed to balance the two tensile pulling forces consists of hook 45 connected to lug 31, hook 46 connected to the plate 28, chains 44 and 47 which may be connected together, the chain 47 extending to a point on the automobile to provide the needed reaction force to balance the two tensile pulling forces.

FIGURES 21, 22 and 23 illustrate the mode of operation of the force transmission unit 23 with the elevated post 34 attached thereto for the purpose of providing a tranverse pulling force at a higher selective location than is possible in the case of FIGURES 17 through 20. The mode of operation consists of securing one end of the chain 17 to the hook 45, passing said chain around the pulley 48 attached to the head of jack 13, around pulley 32, then around pully 39 and upward and around pully 40, adjacent the upper end of the post 34, and outwardly in a generally transverse direction to apply a tensile pulling force to an automobile. Said elevated tensile pulling force causes a reaction force which is resisted by the reaction chain 44 which is connected to reaction hook and clevis 41 with the other end of said chain 44 being connected to a point on the automobile. Another mode of operation is possible with the combined assemblies of units 23 and 34 wherein the same tensile pulling force is achieved at a high elevation, as shown in FIGURE 23, with the addition of another tensile pulling force, as shown in FIGURE 19. In this case, the chain 17 is passed around pulley 33 instead of being anchored to the hook 45. A reaction chain 44 is used as in FIGURE 19, in addition to the reaction chain 44, shown in FIGURE 23. This mode of operation is especially useful when a high tensile pull is required along the automobile body, such as a quarter panel location, and another tensile pull is required simultaneously at a point under the frame of the said automobile.

Figure 24:
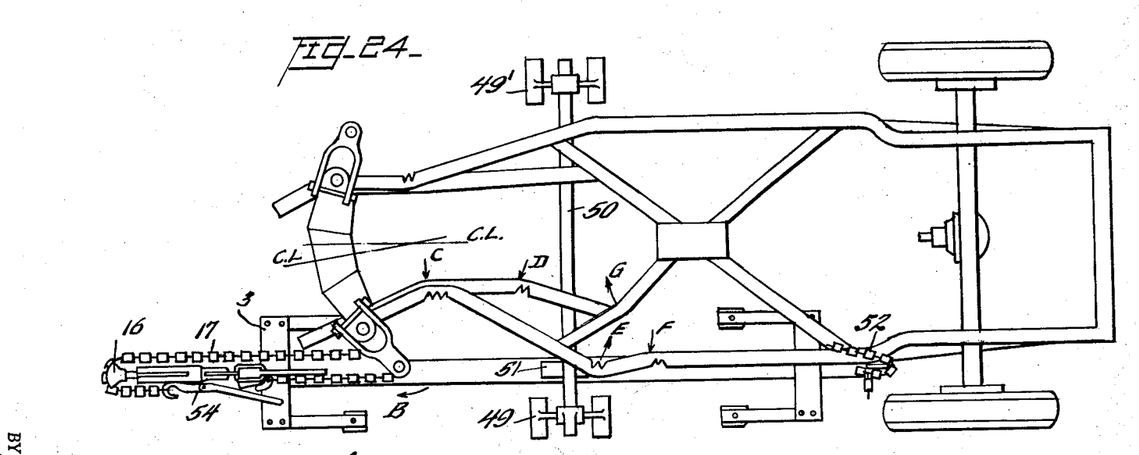
FIGURE 24 is a plan view of the present invention attached to an automobile for the correction of bent component parts.
Figure 25:
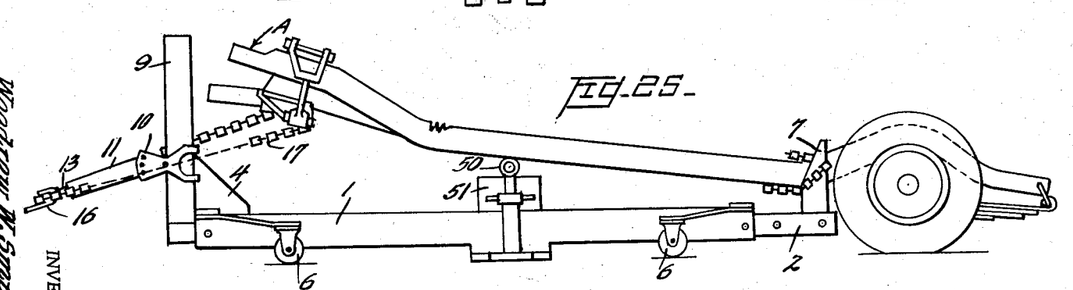
FIGURE 25 is a side elevation corresponding to FIGURE 24 showing the straightening machine and means to support the automobile in an inclined plane.

FIGURES 24 and 25 illustrate an automobile frame in which major damage has occurred by a front end collision in which the front wheel control arms have been bent backwardly with a resulting deformation of several frame parts. The side elevation (FIGURE 25) shows how the damaged side rail of the frame will be bent upwardly by the impact of the collision forces. The same side rail will be forced backwardly by the impact compression forces which result in bent frame members which will be deformed from the front cross member to a point near the center of the frame, where the collision forces will be resisted and cancelled out by the X member in the center of the said frame. The present invention operates in the most efficient manner when it applies corrective forces in a reverse direction from the collision forces which caused the damage to the said frame. And in order to achieve the most efficient mode of operation, the front end of the frame should be supported at a point behind the vertical bend in the side rail, as shown in FIGURE 25. Said supporting elements will consist of the two adjustable height stands 49 and 49', arranged outside the outline of the automobile frame, and a cross member 50 which should be positioned, as shown, between the center of gravity and the damaged end of the frame, thus supporting a large part of the weight of the frame in a cantilever manner. The present apparatus is positioned under the raised frame, as shown in FIGURES 24 and 25, with the reaction abutment 7 near the rear wheel of the automobile and beyond the point of damage. The said abutment 7 may be positioned in front of a frame cross member or secured to the frame side rail by means of a chain 52, as shown. A rigid supporting block 51 is placed on top of the beam 1 and below the cross member 50 so that the forces applied will not cause the beam 1 to rise to any appreciable extent, although it can pivot about its reaction engagement with the automobile.

The force applying means consisting of the elements attached to the cantilever type post 9 are positioned at a downward angle so that the chain 17 connected from the chain holder 16 to the wheel control arm 53 will exert a downward and forward moving tensile pulling force. The two ends of the chain 17 are connected to a slack adjusting tool 54, commonly known as a load binder, so that said slack adjusting tool may apply an initial tension to the chain 17 before operating the hydraulic jack to apply a tensile force to the automobile frame.

As the moving tensile pulling force is applied to the frame, a longitudinal force will be resisted by the reaction post 7 and the corrective actions in the said frame will occur as denoted by the arrows lettered from A to G. It will be obvious that when one side rail became bent upwardly, as shown in FIGURE 25, the front cross member became twisted. And as the bent side rail is pulled forward and down by the applied tensile force, the said front cross member will be untwisted and straightened by the corrective forces. In the case of severe bends, such as shown in FIGURES 24 and 25, some of the deformed frame parts may be buckled and/or wrinkled as denoted at X. When the corrective tensile forces are applied, these wrinkled portions may be heated to a dull red heat while under the tensile influence of the force applying system in order to achieve accurate alignment and smooth frame surfaces at the wrinkled portions. With the said frame supported at a point adjacent the damaged areas so that the supporting elements 49 and 50 are supporting a large part of the weight of the said frame, gravity acting on the suspended portion of the frame will aid in straightening the said frame by cooperating with the force which is applied at a forward and downward angle. The said downward angle of the force applied will result in a reaction force to the beam 1 tending to raise the front end of said beam 1 from the floor which reaction is resisted by the rigid block 51 interposed between the top of the beam 1 and below the cross member 50. The applied moving tensile force will cause certain frame areas as at C, D, E, F and G to move transversely which will result in operative transverse movement of one end of the longitudinal beam 1 by pivoting about the reaction member 7.

The severely damaged frame shown in FIGURES 24 and 25 is illustrative only. Certain variations in the nature of the collision damage can result in variations in the bent frame portions, in which cases the present apparatus would be connected to the frame in a slightly different manner to achieve the best results. Such frames in many cases have been discarded as a total loss, the present apparatus not being available to enable this corrective procedure.

FIGURES 26 through 31 pertain to collision damage in the rear half of the automobile chassis, which presents problems of a different nature than does damage in the front half of the automobile, whether it has a conventional frame or is frameless, of the "unit body" type. This great difference in conditions is brought about by the curved arch portions in the frame longitudinal structural members in which substantial vertical clearance is required below the frame or structural members for the rear axle of the automobile to function at the various loaded levels of said automobile frame or body.

Figure 26:
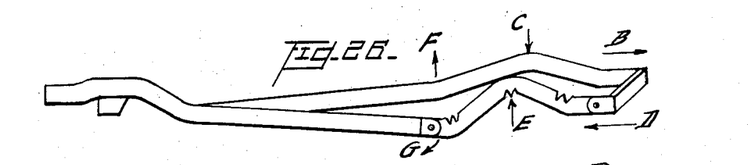
FIGURE 26 is a side elevation of an automobile frame that is bent transversely and twisted because one side rail is shortened and the other rail is elongated.
Figure 27:
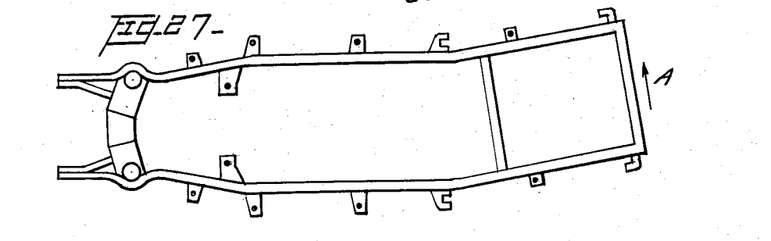
FIGURE 27 is a bottom plan view of the frame in FIGURE 26 showing the transverse bent condition.

When the rear end of a frame or unit body is bent in a transverse direction, as shown in the bottom plan view of FIGURE 27, one of the side rails will become elongated and the other side rail will be shortened, as shown in the side elevation of FIGURE 26. When the side rail is elongated as indicated by the arrow B in FIGURE 26 the rail will be raised as at F and lowered as at C, thus deforming the radius of the arched portion of the side rail. The other side rail will be shortened as indicated by the arrow D and the side rail will be lowered as at G and raised as at E. This condition will cause an apparent twist in the central section of the frame or body which would be extremely difficult to remedy, because if the central section of the twisted frame were straightened, then the rear section of the frame would be twisted with respect to the balance of the frame. FIGURES 26 and 27 are illustrative of the conditions of this art and are included to clarify the state of the past and present art.

Figure 28:
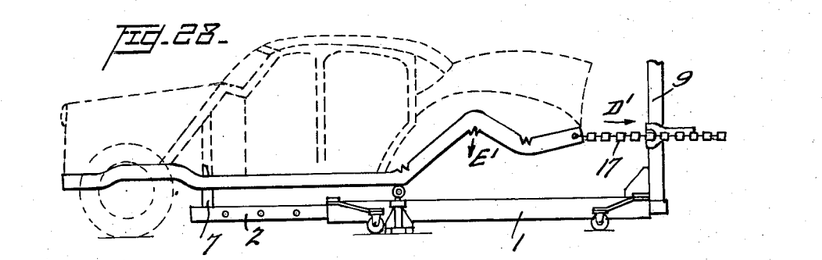
FIGURE 28 is a side elevation view of a bent frame and body with the present invention applied for one phase of the corrective procedure.

In FIGURE 28 I show a side elevation view of a frame and body in which the frame or longitudinal structural members are deformed as in FIGURES 26 and 27. In this case the present invention is connected to the said frame for the purpose of applying a tensile pull to the shortened side rail in order to stretch it out to its proper length. The beam 1 is positioned under the automobile as shown in FIG. 28 with the reaction member 7 engaged against a rigid frame member near the front end of the automobile and beyond the point of frame damage. The opposite end of the longitudinal beam 1 and the force applying system supported thereby project outside the outline of the rear end of the automobile, flexible force transmitting means being connected from the automobile to the said force applying system at a higher elevation than the height of the reaction member 7. A tensile force is applied to the automobile by the force applying system in the direction indicated at D' which tends to straighten the bent frame as at E', and due to the unequal heights of the applied tensile force and the reaction force on member 7 a vertical reaction force will be imparted to the one end of beam 1 and supported force applying system tending to raise the said one end of the beam 1. With the said one end of the beam 1 raised from the floor heat may be applied to the wrinkled portions of the frame as at E' and the frame may be further straightened without the addition of more applied tensile force.

Figure 29:
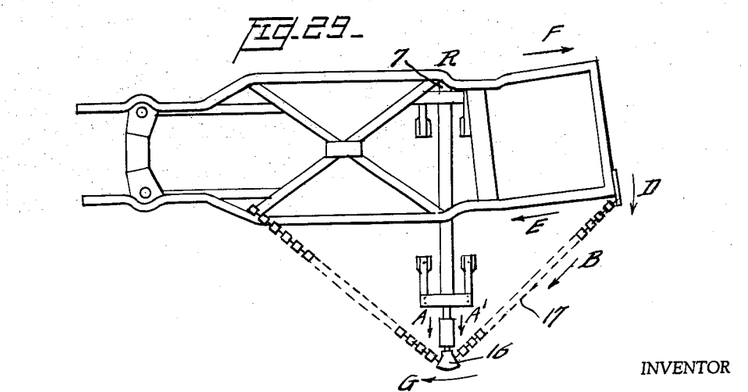
FIGURE 29 is a plan view of a bent frame in FIGURES 26 and 27 and illustrates a method of correcting all the bent conditions with the present invention.

In order to correct the frame damage as shown in FIGURES 26 and 27 by using the present invention the first operation may be to proceed as shown in FIGURE 28 and pull the shortened side rail partially to its correct length and to remove the wrinkled conditions by the use of heat while the side rail is under tension from the apparatus. The operator will then proceed as shown in FIGURE 29 by positioning the apparatus with the beam 1 in a transverse direction to the automobile, the beam being positioned under the parked automobile so the abutment post 7 is against the opposite side rail. A chain 17 is secured to a rigid member adjacent the front end of the automobile, then the said chain is passed around the chain holder 16 on the front end of the jack 13 on the force applying system outside the outline of the automobile and the other end of the said chain is secured to a rigid location on the rear corner of the said frame.

As force is applied by the hydraulic jack 13 and related elements, a tensile pulling force is imparted to the chain 17, and a reaction force in the opposite direction is imparted to the reaction post 7 and against the opposite side of the frame. These forces, as applied to the frame, will cause the rear end of the frame to bend sidewise into alignment as shown by the arrow D. The opposite side rail of the frame will become elongated as shown by the arrow F as the frame bends transversely, and the near side rail of the frame will be shortened as shown by the arrow E, and as the force is applied by the jack head 16 to the chain 17 the rear end of the frame will move transversely as at D, causing the operative movement of the longitudinal beam 1 in the direction indicated at G.

In FIGURES 1 and 2 it is disclosed that the working length of the apparatus is adjustable by means of the telescoping tubular part 2, therefore, the apparatus of the present invention may be positioned as in FIGURE 29 with the total working length from the reaction post 7 to the chain holder 16 adjustable from a relatively short to a longer length. If the apparatus in FIGURE 29 is operatively positioned at its longest length the chain reaches 17—17 will have a minimum of divergent angle which will cause the transverse bending force shown by the arrow D to be a maximum force and the shortening force shown by the arrow E will be at a minimum. If the apparatus is positioned at its shorter length, the chain reaches 17—17 will be spaced at a wide divergent angle which will result in less transverse bending force at the arrow D and greater forces at the arrow E which tend to compress and shorten the frame side rail. The inventor has found that with a little practice and experience the operator will adjust the working length of the apparatus to the preferred length according to the condition of the bent frame.

Figure 30:
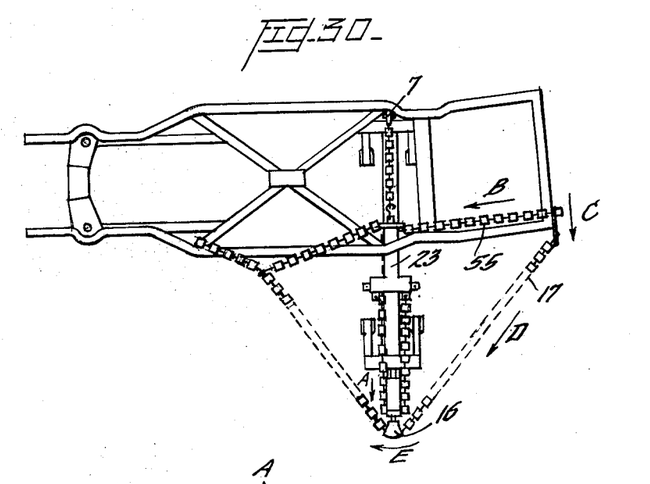
FIGURE 30 is a plan view of a bent frame as in FIGURES 26 and 27 with the present invention using a plurality of force applying means for independent control of the corrective forces.

FIGURE 30 illustrates the same type of bent frame as shown in FIGURE 29 and with the same position of the apparatus as in FIGURE 29. However, in FIGURE 30 the force transmission unit 23 is included, the said force unit 23 receiving an applied force by means of the chain 55 which is looped around the chain holder 16 of the lower hydraulic jack 13 shown in FIGURE 2. The chain 55 passes around the pulley 33 shown in FIGURE 11, as shown in FIGURE 19 in which said pulley 33 is located under the automobile frame, enabling the chain 55 to be applied to the rear corner of the automobile frame for the application of a direct pull on said frame corner. The pulling force applies a compressive force to the frame rail, thereby shortening it to its proper length and thereby restoring the arched portion of the side rail to its normal curved condition. The chain 17 in FIGURE 30 applies a pulling force the same as in FIGURE 29 by means of the upper jack 8 (FIGURE 2). The combination of the two force applying means results in independent control of the corrective bending forces so that the transverse bending force and the side rail compressive force will result in completely straightening the frame to its original shape in one operation without stopping to re-set the apparatus, and as the tensile force is applied by the jack head 16 to the chain 17 the rear end of the frame at C will move in a transverse direction and cause the longitudinal beam 1 to move as at E by pivoting about the reaction member 7.

Figure 31:
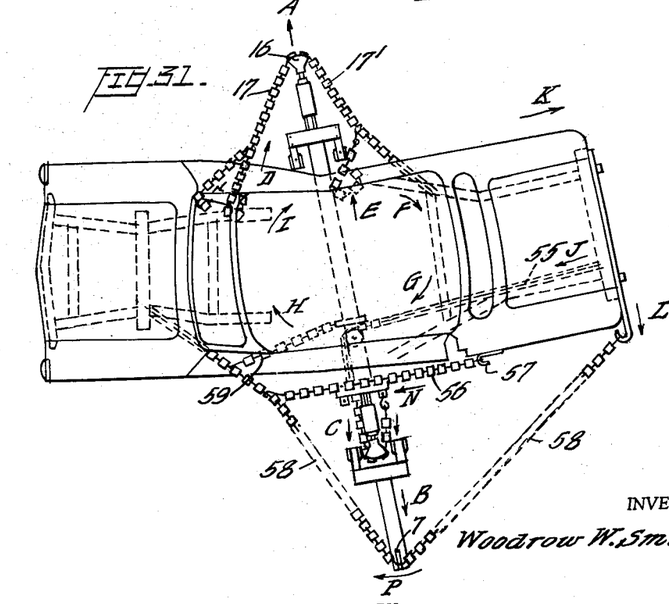
FIGURE 31 is a plan view of a "unit body" type automobile with the present invention attached with a plurality of force applying means and multiple direction tensile pull forces applied to correct all the collision damage in the whole body.

FIGURE 31 illustrates a plan view of a "unit body" automobile which has no conventional frame per se, in which complete support of the automobile is achieved by the combined structural elements within the said unit body, all of the said structural elements being of light gauge metal and being welded into a single unit to provide a strong, light weight structure. The unit body type automobile shown in FIGURE 31 is bent transversely within the body and said damage was caused by a typical collision force against the right side of the body at a mid-way location causing major damage to the doors on the right side of the body and with the rear end of the body bent around transversely to the right. This is a common condition in the industry and the distortion within the body caused by stretching one side of the body and compressing the opposite side will always cause the center section of the "frame" or body to be twisted as shown in FIGURE 26. The twist in the central section will cause the roof panel to move in a rotational direction which causes the front and rear glass openings to be bent out of "square" or alignment. This will cause the windshield and rear glass to either break or be ejected out of place. The right side of the body at the collision point will be bent inward which will deform the door posts and buckle the floor panel. The rear end of the body will be bent around to the right which results in an abnormal opening between the rear quarter panel and the rear door on the opposite side from the collision point.

Without the use of the present invention and methods most of the unit body cars that become damaged in this typical manner were written off as total losses, due to the extremely high cost to repair them in a satisfactory manner. It has proven to be an impossible task to repair unit body cars damaged in this manner just by the transverse bending of the rear end around into alignment as shown by the arrow L at the rear end of the vehicle, unless numerous other damaged areas on the body are corrected before starting the transverse bending correction force at the rear end of the vehicle. Shop practice has disclosed that the roof panel must be re-squared into alignment before the rear end of said body can be bent transversely without severe damage to many of the body structural members.

A single collision impact on a unit type automobile body will deform numerous structural elements in the body. Furthermore, the damaging actions do not occur simultaneously. The damage begins at the instant and locale of the impact upon one part of a single structural member and progressively crushes and deforms one structural element after another until the total force of the collision impact has been absorbed by the combined bending and/or crushing resistance of the several deformed structural members. All of this progressive damage may occur within only a fraction of a second or a greater time, depending on the nature of the collision impact and the resistance thereto.

The above described collision damaged automobile of FIGURE 31, having a plurality of damaged areas, may be corrected in the most efficient manner with the present invention by positioning the apparatus as shown in FIGURE 31 with the beam 1 transversely under the automobile with the force applying means consisting of the jack 13 and the chain tool 16 adjacent the right or shortened side of the automobile. The chain reaches 17 extend from the chain tool 16 to a plurality of locations on the right side of the body according to the damaged areas in any specific case. The reaction member 7 is attached to the opposite end of the beam 2 and chain 58 is attached to a rear corner of the said frame and extends around the outer side of the reaction member 7, then forward to a location adjacent the front end of the said automobile.

As the force A is applied by the jack 13, a tensile pulling force will be applied by the primary chain 17 to the adjacent damaged areas, and the reaction force B within the apparatus will cause the chain 58 to exert another tensile force on the body of the automobile of equal intensity to the primary force applied on the opposite side of the said body. These two forces applied to the damaged body will cause corrective motion to areas D and E on the right side of the damaged body, the roof panel of the body will be moved in a rotary direction as indicated at F, G, H and I, the right rear corner of the body will be moved as at K to increase the radius in the curved portions of the frame structure and to elongate the right side of the said body; the left side of the body will be moved as at J to decrease the radius in the curved portions of the frame structure and to shorten the length of that side while the rear end of the damaged body will be moved transversely as at L. As the tensile force is applied by the jack head 16 to the chains 17 and 17' the longitudinal beam 1 will move in an axial direction as at B which causes the reaction member 7 to exert a tensile force to the chain 58 which moves the rear end of the automobile transversely as at L, which causes an operative movement of one end of the said longitudinal beam 1 as shown at P.

The primary forces applied to the damaged body will be divided between numerous areas of said body and each area will exert a co-operating force on all the adjacent surrounding areas with each area having a correcting force of less intensity than the prime force exerted by the jack 13.

FIGURE 31 shows a wide gap on the left side of the damaged body between the rear left door and the front end of the rear quarter panel. In cases where the correction of the said gap condition tends to lag behind the general corrective motions, a hook 57 is attached to the face of the rear quarter panel, preferably by brazing or soldering. An auxiliary chain 56 is attached to said hook 57 and connected to the forward chain reach 58 with said chain reach 58 deviated from its straight line position. As a tensile force is applied to the said forward chain reach 58, the latter will cause a tensile force to be applied to the auxiliary chain 56 which will aid in pulling the rear quarter panel forward into its proper position.

In addition to all the above described corrective forces applied to the said damaged body, the force transmission unit 23, shown in FIGURES 19 to 23, may be applied to the beam 1 and connected to a separate jack 13, as shown in FIGURE 31, to apply another tensile force to the rear corner of the frame structure with independent control of the additional corrective force applied to the frame structure. A chain 55 is attached to the rear corner of the frame structure, extended forward and around the pulley 33, into the force transmission unit and around the pulley 48, the dead end of the chain 55 being attached to reaction lug 30. As the force is applied by the jack 13, a tensile pulling force will be applied to the rear corner of the frame structure and body independently of the force applying means on the apparatus at the opposite side of the automobile. In order to prevent tipping of the apparatus, a reaction chain 59 extends from the transmission unit 23 to the chain reach 58 or other suitable point, as is also the case in FIGURE 30.

It will be understood that the structure set forth above may be varied without departing from the spirit of this invention as set forth herein and in the appended claims.

Having thus described the invention, what is claimed as new and desired to be secured by Letters Patent is:

1. A device for straightening damaged automobiles comprising, in combination, a longitudinal beam supported on anti-friction means enabling a plurality of horizontal movements of the beam during the straightening operation and said beam being capable of having a substantial portion of its length operatively positioned under a parked automobile in any horizontal direction with an end portion of said beam projecting outside the outline of the automobile, force reaction means engaging said longitudinal beam adjacent one end thereof and consisting of a member which is operatively applicable to said automobile at a location beyond the point of frame or body damage, for the resistance of an applied force directed longitudinally of the said beam, a force applying system comprising a cantilever type member extending transversely to the said beam to a higher elevation than the said reaction member and being secured to said beam is a fixed axial location adjacent an end opposite from the said reaction member, a force applying means operatively connected to the said cantilever type member and adapted to apply a force directed generally longitudinally of said beam, flexible force transmitting means adapted to be operatively interconnected between the said automobile and the said force applying system for the application of a self-aligning corrective tensile force to said automobile, and a secondary force transmission means movably mounted on the said longitudinal beam assembly, said secondary force transmission means comprising a frame, a system of rotatable grooved pulleys mounted in said frame for the reception of moving flexible force transmitting means, said frame having means to align and guide the said secondary force transmission means on the said longitudinal beam assembly, a flexible stationary force reaction means connected from the force reaction member on one end of said longitudinal beam to said secondary force transmission means securing it in fixed longitudinal position with respect to the said longitudinal beam assembly, the said flexible force transmitting means being adapted to be operatively interconnected from the automobile, around at least one of the said rotatable grooved pulleys and to the said force applying system for the application of moving tensile pulling forces to the said automobile in a direction transverse to the direction of the force applied by the said force applying means.

2. A device for straightening damaged automobiles comprising, in combination, a longitudinal beam supported on anti-friction means enabling a plurality of horizontal movements of the beam during the straightening operation and said beam being capable of having a substantial portion of its length operatively positioned under a parked automobile in any horizontal direction with an end portion of said beam projecting outside the outline of the automobile, force reaction means engaging said longitudinal beam adjacent one end thereof and consisting of a member which is operatively applicable to said automobile at a location beyond the point of frame or body damage, for the resistance of an applied force directed longitudinally of the said beam, a force applying system comprising a cantilever type member extending transversely to the said beam to a higher elevation than the said reaction member and being secured to said beam in a fixed axial location adjacent an end opposite from the said reaction member, a force applying means operatively connected to the said cantilever type member and adapted to apply a force directed generally longitudinally of said beam, flexible force transmitting means adapted to be operatively interconnected between the said automobile and the said force applying system for the application of a self-aligning corrective tensile force to said automobile, a force transmission unit comprising a frame, a system of rotatable grooved pulleys mounted on said frame for the reception of flexible force transmitting means, said frame having means to align and guide the said force transmission unit on said longitudinal beam of said automobile straightening apparatus, a force applying system comprising the said force transmission unit, force applying means supported on said unit, flexible force transmitting means extending from the force applying means, around at least one of the rotatable grooved pulleys and outwardly in a direction transverse to the direction of the applied force and adapted to be connected to an automobile for the application of a moving tensile force on a portion of said automobile, and flexible stationary force reaction means connected from a portion of the automobile to a force reaction connection on the said transmission unit in an opposite direction from the direction of the moving tensile force applied to the automobile.

3. A device for straightening damaged automobiles comprising, in combination, a longitudinal beam supported on anti-friction means enabling a plurality of horizontal movements of the beam during the straightening operation and said beam being capable of having a substantial portion of its length operatively positioned under a parked automobile in any horizontal direction with an end portion of said beam projecting outside the outline of the automobile, force reaction means engaging said longitudinal beam adjacent one end thereof and consisting of a member which is operatively applicable to said automobile at a location beyond the point of frame or body damage, for the resistance of an applied force directed longitudinally of the same beam, a force applying system comprising a cantilever type member extending transversely to the said beam to a higher elevation than the said reaction member and being secured to said beam in a fixed axial location adjacent an end opposite from the said reaction member, a force applying means operatively connected to the said cantilever type member and adapted to apply a force directed generally longitudinally of said beam, flexible force transmitting means adapted to be operatively interconnected between the said automobile and the said force applying system for the application of a self-aligning corrective tensile force to said automobile, means to rigidly support an automobile above a floor with a substantial portion of the automobile being suspended in a cantilever manner, said supporting means comprising a member positioned transversely to the automobile and adapted to be supported adjacent each end of said member, floor supported bases positioned outside the outline of the automobile frame and supporting said member adjacent its ends, and means rigidly spacing the longitudinal beam with respect to the said automobile supporting means.

4. A method for correcting a damaged automobile frame and/or body comprising the steps of raising the automobile to a distance above a floor, placing a supporting member transversely under the said automobile and supporting said transverse member adjacent each end thereof by means of floor supported base members positioned outside the outline of the said automobile frame for supporting a substantial portion of the automobile in a cantilever manner, positioning a substantial portion of a wheel supported longitudinal beam, having a force applying system at one end thereof, under the automobile frame in a desired horizontal direction, rigidly spacing the longitudinal beam from the supporting transverse member, engaging a force reaction member with that end of said beam opposite said force applying system with said reaction member positioned to apply a reaction force to said frame or body at a point beyond the damaged area, causing the other end of said beam to assume a desired position with the force applying system located adjacent said other end of the longitudinal beam in a fixed axial location thereof and outside the outline of the automobile, interconnecting flexible force transmitting means from the force applying system to a location on the said automobile such that the damaged area is between the said reaction member and the force applying system, actuating the said force applying system to apply a moving tensile force in a generally horizontal direction to the automobile with the said tensile force being resisted by the said force reaction member, applying heat to localized areas of the damaged frame or body, continuing the application of the heat and the moving tensile force to the automobile and causing the damaged area to move toward its true shape with the said moving tensile force causing a self-aligning reaction tending to align the direction of the said tensile force with the points of application of the tensile force to said automobile, and thereby causing directional operative movements to the wheel supported longitudinal beam as the frame and/or body straightens to its original normal shape.

5. A method for correcting a damaged automobile frame and/or body comprising the steps of positioning a substantial portion of a wheel supported longitudinal beam, having a force applying system at one end thereof, under a parked automobile frame in any desired horizontal direction, engaging a force reaction member with that end of said beam opposite said force applying system with said reaction member positioned to apply a reaction force to said frame or body at a point beyond the damaged area, causing the other end of said beam to assume a desired position with the force applying system located adjacent said other end of the longitudinal beam in a fixed axial location thereof and outside the outline of the automobile, interconnecting flexible force transmitting means from the force applying system to a location on the said automobile such that the damaged area is between the said reaction member and the force applying system, actuating the said force applying system to apply a moving tensile force in a generally horizontal direction to the automobile with the said tensile force being resisted by the said force reaction member, applying heat to localized areas of the damaged frame or body, continuing the application of the heat and the moving tensile force to the automobile and causing the damaged area to move toward its true shape with the said moving tensile force causing a self-aligning reaction tending to align the direction of the said tensile force with the points of application of the tensile force to said automobile, and thereby causing directional operative movements to the wheel supported longitudinal beam as the frame and/or body straightens to its original normal shape, said moving tensile force from the force applying system to the automobile being applied at a greater elevation than the height of the said reaction member, causing a vertical force reaction to the said force applying system and one end of the said longitudinal beam, tending to lift the one end of the said longitudinal beam and the component parts attached thereto from the floor, and enabling the potential energy in the lifted beam and related parts to perform further straightening of the automobile without the addition of more applied tensile force to the said automobile.

References Cited in the file of this patent

UNITED STATES PATENTS

| | | |
|---|---|---|
| 1,676,263 | Hawkins | July 10, 1928 |
| 2,442,604 | Johnson et al. | June 1, 1948 |
| 2,597,103 | Johnson et al. | May 20, 1952 |
| 2,597,234 | Elam | May 20, 1952 |
| 2,634,788 | Harteker et al. | Apr. 14, 1953 |
| 2,639,890 | Haubert | May 26, 1953 |
| 2,725,917 | Kauppi | Dec. 6, 1955 |
| 2,750,983 | Rodgers | June 19, 1956 |
| 2,757,705 | Johnson | Aug. 7, 1956 |
| 2,792,046 | Fagen | May 14, 1957 |
| 2,792,047 | Fagen | May 14, 1957 |
| 2,998,837 | Luedicke et al. | Sept. 5, 1961 |
| 3,050,099 | Smith | Aug. 21, 1962 |

OTHER REFERENCES

Damage Dozer, by Blackhawk Automotive Division.
Padgett-Puller, by O'Neal Steel Products Co.